(12) United States Patent
Ikeboh et al.

(10) Patent No.: US 8,419,907 B2
(45) Date of Patent: Apr. 16, 2013

(54) ION ELUTING UNIT, DEVICE PROVIDED THEREWITH, AND WASHING MACHINE

(75) Inventors: Yasuhiro Ikeboh, Yao (JP); Mugihei Ikemizu, Osaka (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 1677 days.

(21) Appl. No.: 10/589,393

(22) PCT Filed: Apr. 22, 2005

(86) PCT No.: PCT/JP2005/007673
§ 371 (c)(1),
(2), (4) Date: Aug. 15, 2006

(87) PCT Pub. No.: WO2006/011275
PCT Pub. Date: Feb. 2, 2006

(65) Prior Publication Data
US 2007/0175833 A1 Aug. 2, 2007

(30) Foreign Application Priority Data

Jul. 27, 2004 (JP) ................. 2004-218216

(51) Int. Cl.
*C02F 1/461* (2006.01)
(52) U.S. Cl.
USPC .................. 204/229.6; 204/228.1; 204/229.4
(58) Field of Classification Search .... 204/228.1–228.6, 204/229.4, 229.6
See application file for complete search history.

(56) References Cited

U.S. PATENT DOCUMENTS

| 4,769,119 A | * | 9/1988 | Grundler | ................. | 210/748.18 |
| 6,344,132 B1 | | 2/2002 | Hirayama et al. | | |
| 6,929,740 B2 | * | 8/2005 | Hayes | ............................ | 210/138 |
| 2003/0164308 A1 | * | 9/2003 | Schlager et al. | .............. | 205/701 |
| 2003/0213503 A1 | * | 11/2003 | Price et al. | ....................... | 134/18 |
| 2004/0035798 A1 | | 2/2004 | Holland | | |
| 2006/0130533 A1 | * | 6/2006 | Ooe et al. | ........................ | 68/3 R |

FOREIGN PATENT DOCUMENTS

| EP | 1 156 014 A1 | 11/2001 |
| EP | 1 469 116 A2 | 10/2004 |
| JP | 5-74487 U | 10/1993 |
| JP | 11-207352 A | 8/1999 |
| JP | 2000-126775 A | 5/2000 |
| JP | 2001-276484 A | 10/2001 |
| JP | 2002-81121 A | 3/2002 |
| JP | 2002-219463 A | 8/2002 |
| JP | 2004-166938 A | 6/2004 |
| JP | 2004-173717 A | 6/2004 |
| JP | 2006-6646 A | 1/2006 |

* cited by examiner

*Primary Examiner* — Arun S Phasge
(74) *Attorney, Agent, or Firm* — Birch, Stewart, Kolasch & Birch, LLP

(57) ABSTRACT

A metal ion eluting unit according to the present invention includes: a plurality of electrodes 102 and 103; a drive circuit (not shown) that applies a voltage between the electrodes; and a control circuit (not shown) that controls the drive circuit so that the drive circuit periodically reverses the polarity of the voltage applied between the electrodes, operates, from every time the polarity of the voltage applied between the electrodes is reversed until a predetermined period elapses, in a first current mode in which the value of a current flowing between the electrodes equals a first value, and operates, thereafter, in a second current mode in which the value of the current flowing between the electrodes equals a second current value different from the first current value. According to this configuration, metal ions can be efficiently and stably eluted for a prolonged period of time.

16 Claims, 12 Drawing Sheets

US 8,419,907 B2

ION ELUTING UNIT, DEVICE PROVIDED THEREWITH, AND WASHING MACHINE

BACKGROUND OF THE INVENTION

1. Field of the Invention

The present invention relates to a metal ion eluting unit that elutes antibacterial metal ions into water, and an apparatus that uses water including the metal ions eluted by the metal ion eluting unit.

2. Description of the Related Art

Due to a growing female employment rate and the trend toward nuclear families in recent years, in more and more households, nobody stays home during the daytime. Such households frequently dry laundry indoors. Even households where someone stays home during the daytime dry laundry indoors in rainy times. In the indoor drying, bacteria and mold are more likely to propagate in the laundry than in the sun drying. This trend is more remarkable when it takes much time to dry laundry, such as in high humidity condition, e.g., rainy season, or low temperature condition. The laundry may give out foul smells, depending on the propagation condition. Therefore, households that ordinarily have no choice other than the indoor drying have a strong need for subjecting fabrics to an antibacterial treatment to suppress the propagation of bacteria and mold.

Recently, more and more clothes have textiles that are subjected to an antibacterial-deodorizing treatment or bacteria-control treatment. However, it is difficult to offer the household with textile products that are all subjected to an antibacterial-deodorizing treatment. Moreover, the effect of the antibacterial-deodorizing treatment decreases with the increasing number of washes.

Accordingly, technology has been proposed which subjects laundry to an antibacterial treatment in each wash. Patent document 1, for example, discloses an electric washing machine equipped with an ion generator that generates metal ions having sterilizing capability. Patent document 2 discloses a washing machine including a silver-ion-adding unit that adds silver ions to washing water.

Silver ions, copper ions, and the like are known as antibacterial metal ions. The silver ions in particular have been well known since early times to have sterilizing capability. Such antibacterial metal ions are characterized in that they are more stable than chlorine, maintains the sterilizing effect, and do not generate harmful substance.

The metal ion elution is generally performed by using an electrode type metal ion eluting unit. In the electrode type metal ion eluting unit, the application of a voltage between electrodes causes a current to flow between the electrodes, thereby eluting metal ions from the positive electrode in accordance with the Coulomb's law. The concentration of metal ions eluted is generally controlled by the volume of water flowing between the electrodes and the current flowing therebetween.

The electrode type metal ion eluting unit generally encounters a problem that calcium carbonate or the like deposits on the negative electrode, i.e., scale deposition. Thus, this scale deposition is generally prevented by periodically reversing the polarity of the voltage applied between the electrodes so that the positive and negative electrodes are periodically switched to each other.

Patent document 1 Japanese Utility Model Laid-open No. H5-74487

Patent document 2 Japanese Patent Application Laid-open No. 2001-276484

SUMMARY OF THE INVENTION

Problems to be Solved by the Invention

In an electrode type metal ion eluting unit, to use silver ions, for example, as metal ions to be eluted, a silver electrode or silver-containing electrode is provided as a positive electrode. Then this electrode is placed in water together with a negative electrode, and then a voltage is applied between the electrodes. As a result, reaction $Ag \rightarrow Ag^+ + e^-$ occurs in the positive electrode, whereby silver ions ($Ag^+$) are eluted into water. The continuous elution of the silver ions ($Ag^+$) causes the positive electrode to wear.

On the other hand, in the negative electrode, reaction $H^+ + e^- \rightarrow 1/2 H_2$ occurs regardless of what material is used for this electrode. As a result, hydrogen is generated, and scale (e.g., calcium carbonate, magnesium carbonate) formed by dissolved components of water deposits on the surface of the electrode. Moreover, chloride and sulfide of metal composing the positive electrode also deposit on the surface of the negative electrode. Thus, the prolonged use of the electrode type metal ion eluting unit results in thick accumulation of the scale, metal chloride, and metal sulfide on the surface of the negative electrode, which prevents the elution of metal ions. Thus, the elution amount of metal ions becomes unstable or the electrode wears unevenly.

Even if no scale deposits on the negative electrode, the elution efficiency of metal ions may decrease due to water quality. In a case such as where the water has high hardness, high electric conductivity, or high chloride ion concentration, there has been a problem that the elution amount of metal ions decreases, and thus the metal ion concentration decreases, even if no scale deposits on the surface of the negative electrode.

As described above, the elution efficiency of metal ions decreases due to not only the scale deposition but also the water quality. The scale deposition can be prevented to some extent by reversing the polarity of the voltage applied between the electrodes so that the positive and negative electrodes are periodically switched to each other, as described above. In the actual environment, however, this scale deposition and the water quality are involved complicatedly in the decrease in the elution efficiency of metal ions. Moreover, with the mutual synergy effect, the scale deposition cannot be prevented satisfactorily, thus leading to a further decrease in the elution efficiency of metal ions.

Generally, increasing the value of a current flowing between the electrodes can prevent the scale deposition and also improve the elution efficiency of metal ions. However, this has brought about a problem that the electrode wears severely, thus shortening the electrode life, or a problem that the elution concentration of metal ions becomes too high. Too high elution concentration of metal ions has caused a problem of discoloration occurring in clothes washed by a washing machine equipped with an electrode type metal ion eluting unit.

In view of the problems described above, it is an object of the present invention to provide a metal ion eluting unit capable of efficiently and stably eluting metal ions for a prolonged period of time and a device provided with the metal ion eluting unit.

Means for Solving the Problem

To achieve the object described above, according to one aspect of the present invention, a metal ion eluting unit includes: a plurality of electrodes; and a drive circuit that applies a voltage between the electrodes, and elutes metal ions from one of the electrodes serving as a positive electrode by applying the voltage between the electrodes. The metal ion eluting unit further includes a control circuit that controls the drive circuit so that the drive circuit periodically reverses the polarity of the voltage applied between the electrodes, operates, from when the voltage applied between the electrodes is reversed until a predetermined period elapses, in a first current mode in which the value of a current flowing between the electrodes equals a first value, and operates thereafter in a second current mode in which the value of the current flowing between the electrodes equals a second current value which is different from the first current value.

According to such a configuration, setting the first current value at an optimum current value for preventing scale deposition and setting the second current value at a current value for providing an optimum elution efficiency of metal ions in accordance with water quality permits preventing the scale deposition at the initial period of voltage application after the polarity reversal of the voltage applied between the electrodes, and also permits preventing a current, which flows between the electrodes after the initial period of voltage application has passed after the polarity reversal of the voltage applied between the electrodes, from becoming too large. This stabilizes the metal ion elution after the initial period of voltage application has passed after the polarity reversal of the voltage applied between the electrodes, and eliminates a problem of shorter electrode life and a problem of too high elution concentration of metal ions. Consequently, the metal ion elution can be performed efficiently and stably over a long period of time.

From the view point of avoiding the problem of shorter electrode life and the problem of too high elution concentration of metal ions, it is preferable that the first current value be larger than the second current value.

From the view point of avoiding the problem of shorter electrode life and the problem of too high elution concentration of metal ions, it is preferable that the period of the first current mode be shorter than the period of the second current mode.

It is preferable that the drive circuit perform constant-voltage driving during the period of the first current mode and constant-current driving during the period of the second current mode. Performing the constant-voltage driving by the driving circuit during the period of the first current mode permits the flow of a maximum current in accordance with water quality and interelectrode condition, thus improving the effect of scale deposition prevention.

It is preferable that the polarity of the voltage applied between the electrodes be periodically reversed with a voltage application rest time inserted during every reversal. According to such a configuration, the metal ions eluted from the electrode which serves as a positive electrode before the voltage application rest time can be separated from this electrode at a sufficient distance during the voltage application rest time. Thus, even when this electrode turns into a negative electrode after the voltage application rest time, the metal ions eluted before the voltage application rest time is not pulled back by this electrode. Consequently, this does not waste the power consumed for the metal ion elution, and also avoids failure to provide a desired total mount of metal ions. Moreover, when the metal ion eluting unit according to the present invention is incorporated in an apparatus for application, a variation in the water metal ion concentration is decreased by providing the voltage application rest time.

Thus, when the eluted metal ions are antibacterial, an even antibacterial effect can easily be achieved over a wide range.

It is preferable that transfer from the first current mode to the second current mode occur with a voltage application rest time inserted therebetween. According to such a configuration, the scale depositing on the electrode which serves as a negative electrode before the polarity change of the voltage applied between the electrodes, and the like are stripped off from the electrode in the period of the first current mode by the elution of metal ions from the electrode which serves as a positive electrode after the polarity change of the voltage applied between the electrodes. Since the scale stripped off from the electrode can be separated at a sufficient distance from the electrode facing this electrode, the scale stripped off are less likely to deposit again. This prevents the accumulation of the scale and the like on the electrode surface, thereby permitting stable metal ion elution.

It is preferable that a short-circuit be made between the electrodes during the voltage application rest time. This configuration permits the residual potential difference between the electrodes during the voltage application rest time to be completely zero, thereby preventing scale deposition during the voltage application rest time.

It is preferable that the metal ion eluting unit further include a water quality detection portion for detecting water quality of water mediating between the electrodes, wherein the controlling circuit changes at least one of the first current value and the second current value in accordance with the water quality detected by the water quality detection portion. This configuration permits preventing constantly and appropriately preventing the scale deposition and/or constantly and appropriately ensuring the elution concentration of metal ions regardless of the water quality of water used.

It is preferable that the metal ion eluting unit further comprise a water detection portion which detects water quality of water mediating between the electrodes, wherein the controlling circuit changes at least one of the time ratio of the period of the first current mode to the period of the second current mode and the polarity reversal period of the voltage applied between the electrodes in accordance with the water quality detected by the water quality detection portion. This configuration permits constantly and appropriately preventing the scale deposition and/or constantly and appropriately ensuring the elution concentration of metal ions regardless of the water quality of water used, even when the upper limit is provided to the current value due to the limitations of the circuit.

It is preferable that the water quality detection portion detect at least one of water hardness, water electric conductivity, and water chloride ion concentration. Since the elution efficiency of metal ions has correlation with the water hardness, water electric conductivity, and water chloride ion concentration, this configuration permits constantly and appropriately ensuring the elution concentration of metal ions regardless of the water quality of water used.

It is preferable that the water quality detecting portion detect the water quality by detecting at least one of the voltage between the electrodes and the current flowing between the electrodes. This configuration permits achieving a water quality detection portion with a relatively simple and inexpensive circuit.

It is preferable that part or all of the metal ions eluted be any of silver ions, copper ions, and zinc ions. This configuration permits utilizing an excellent sterilizing and fungicidal effects provided by the silver ions, the copper ions, or the zinc ions.

To achieve the object described above, an apparatus according to the present invention is provided with the metal ion eluting unit according to any of the configurations described above. One of such apparatuses according to the present invention is a washing machine.

Advantages of the Invention

The present invention permits achieving a metal ion eluting unit capable of efficiently and stably eluting metal ions over a long period of time, and an apparatus provided therewith.

DETAILED DESCRIPTION OF THE INVENTION

Figure 1:
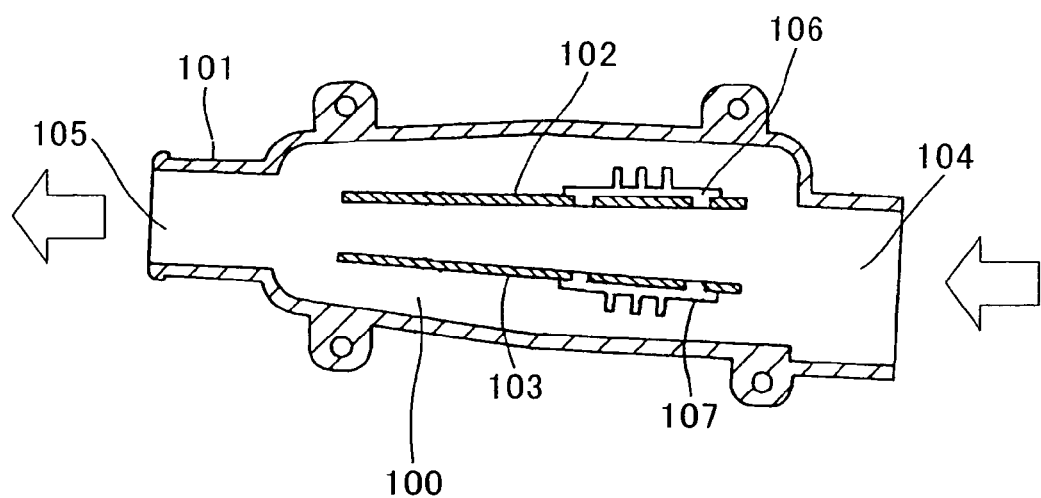
FIG. 1 is a horizontal cross sectional view of an ion eluting portion included in a metal ion eluting unit according to the present invention.
Figure 2:
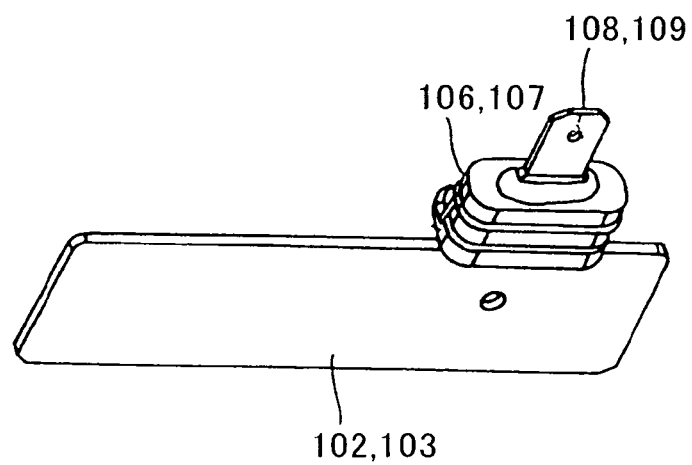
FIG. 2 is a perspective view of an electrode included in the metal ion eluting unit according to the present invention.

An embodiment of the present invention will be described below with reference to the accompanying drawings. First, description will be given on the structure of an ion eluting portion included in a metal ion eluting unit according to the present invention. FIG. 1 shows a horizontal cross sectional view of the ion eluting portion. FIG. 2 shows a perspective view of the electrode.

The ion eluting portion 100 includes a case 101, which has an inlet 104 in one end thereof in the longitudinal direction and an outlet 105 in the other end thereof, both provided for water flow.

The ion eluting portion 100 has in the case 101 two plate-like electrodes: a first electrode 102 and a second electrode 103. In the case 101, the two plate-like electrodes 102 and 103 are arranged along the water flow from the inlet 104 to the outlet 105 in a manner so as to face each other.

Applying a predetermined voltage between the electrodes 102 and 103 in the presence of water in the case 101 causes metal ions contained in metal composing the positive electrode to be eluted from the positive electrode. As an example of the electrodes 102 and 103, silver plates each having a dimension of approximately 20 mm×50 mm and a thickness of approximately 1 mm may be arranged by electrode holding members 106 and 107, respectively, at a distance of approximately 5 mm from each other. The electrode 102 and a connecting terminal 108 that are made of the same metal material are integrally molded together; the electrode 103 and a connecting terminal 109 that are made of the same metal material are integrally molded together.

Applying a voltage between the electrodes 102 and 103 while performing constant-current control that controls the current value during water flow at 29 mA permits producing silver-ion-containing water having a silver ion concentration of approximately 90 ppb with a water flow rate of 20 L/min. This means that, even water flow with water pressure, such as city water pressure, can generate silver-ion-containing water having an enough concentration required for exerting an antibacterial effect.

The material of the electrodes 102 and 103 is not limited to silver. Any other type of metal is acceptable, as long as the metal can serve as a source of antibacterial metal ions. Examples of such optional metal include copper, an alloy of silver and copper, zinc, and the like. Silver ions eluted from a silver electrode, copper ions eluted from a copper electrode, and zinc ions eluted from a zinc electrode provide excellent sterilizing and fungicidal effects. From an alloy of silver and copper, silver ions and copper ions can be eluted simultaneously.

In the ion eluting portion 100, selection can be made between metal-ion-elution and non-metal-ion-elution, depending on whether or not a voltage has been applied between the electrodes 102 and 103. The elution amount of metal ions can be controlled by controlling a current flowing between the electrodes or the voltage application duration. Compared to a releasing method of eluting metal ions from a metal ion carrier, such as zeolite, which is used as a conventional antibacterial material, the selection of whether or not to supply metal ions and also the adjustment of the metal ion concentration can be all made electrically, which is convenient.

Figure 3:
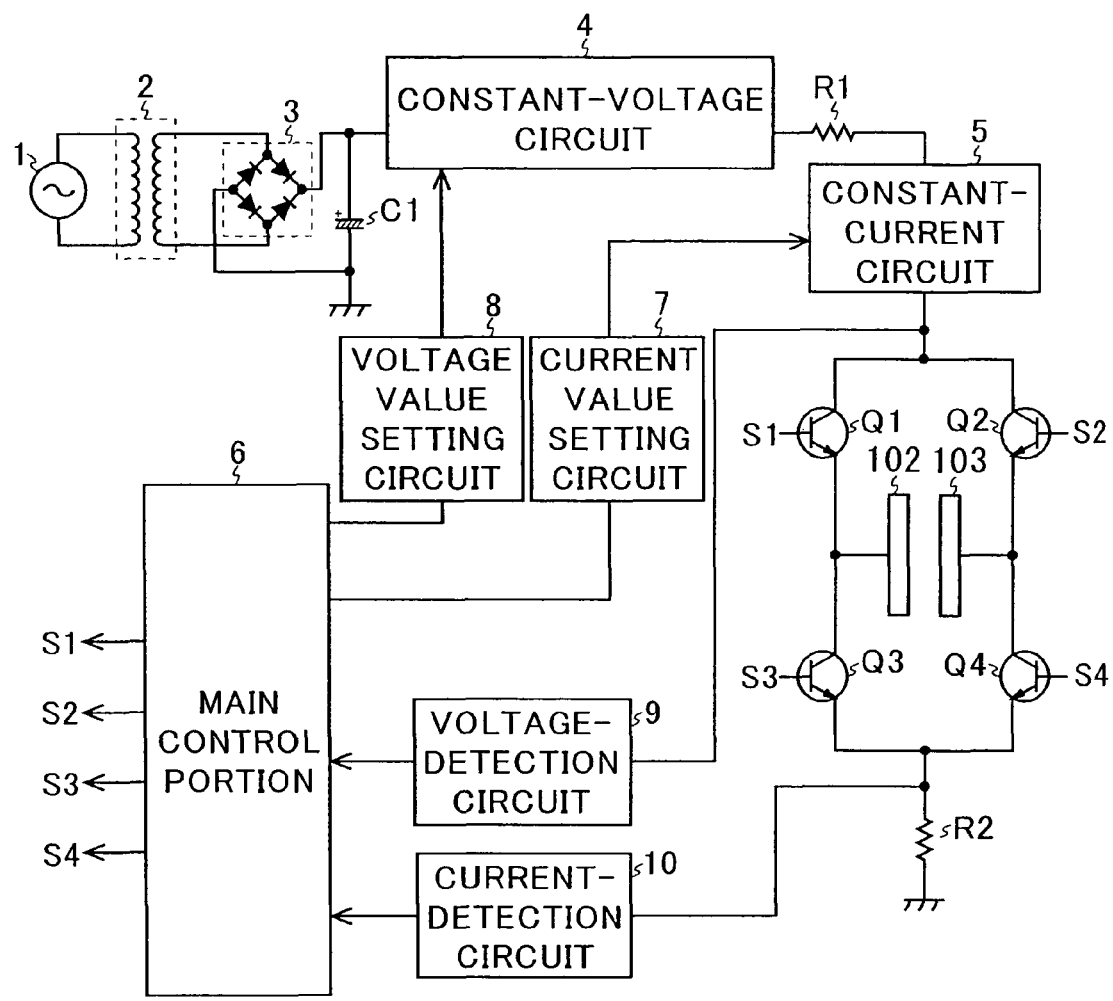
FIG. 3 is a view showing the electrical structure of the metal ion eluting unit according to the present invention.

Next, description will be given on the electrical structure of the metal ion eluting unit according to the present invention. FIG. 3 shows the electrical structure of the metal ion eluting unit according to the present invention.

An insulating transformer 2 steps down an alternating voltage of 100V outputted from a commercial power source 1 on the primary side into a predetermined alternating voltage, and then outputs it to the secondary side. For safety, the insulating transformer 2 insulates the primary side from the secondary side. The output voltage of the transformer 2 is rectified by a full-wave rectifier circuit 3, smoothened by a smoothing capacitor C1, and then formed into a constant voltage in a constant voltage-circuit 4.

The constant voltage outputted from the constant-voltage circuit 4 is supplied to a constant-current circuit 5 via a resistance R1. The constant-current circuit 5 operates so as to supply a predetermined current regardless of a change in the resistance value between the electrodes 102 and 103.

To the output side of the constant-current circuit 5, there are connected the collector of a NPN-type transistor Q1 and the collector of a NPN-type transistor Q2. The emitter of the NPN-type transistor Q1 and the collector of a NPN-type transistor Q3 are commonly connected together and then connected to the electrode 102. The emitter of the NPN-type transistor Q2 and the collector of a NPN-type transistor Q4 are commonly connected together and then connected to the electrode 103. The emitters of the NPN-type transistors Q3 and Q4 are commonly connected together and then grounded via a resistance R2. Control signals S1 to S4 outputted from a main control portion 6 including a microcomputer and the like are fed to the bases of the NPN-type transistors Q1 to Q4, respectively.

When the control signals S1 and S4 are high-level signals and the control signals S2 and S3 are low-level signals, the NPN-type transistors Q1 and Q4 are turned ON while the transistors Q2 and Q3 are turned OFF. Thus, in this state, a positive voltage is applied to the electrode 102 and a negative voltage is applied to the electrode 103. As a result, the electrode 102 serves as a positive electrode and the electrode 103 serves as a negative electrode, so that a current flows from the positive electrode 102 toward the negative electrode 103. This causes the metal ion eluting unit to generate positive ions, i.e., antibacterial metal ions, and negative ions.

On the other hand, when the control signals S1 and S4 are low-level signals and the control signals S2 and S3 are high-level signals, the NPN-type transistors Q1 and Q4 are turned OFF and the transistors Q2 and Q3 are turned ON. Thus, in this state, a negative voltage is applied to the electrode 102, and a positive voltage is applied to the electrode 103. As a result, the electrode 102 serves as a negative electrode and the electrode 103 serves as a positive electrode, so that a current flows from the positive electrode 103 to the negative electrode 102. This causes the metal ion eluting unit to generate positive ions, i.e., antibacterial metal ions, and negative ions.

A voltage-detection circuit 9 detects the output voltage of the constant-current circuit 5, and then outputs the detection result to the main control portion 6. A current-detection circuit 10 detects a current flowing through the resistance R2 and then outputs the detection result to the main control portion 6. A voltage value setting circuit 8 sets an output voltage value of the constant-voltage circuit 4 in accordance with instructions given by the main control portion 6. A current value setting circuit 7 sets an output current value of the constant-current circuit 5 in accordance with instructions given by the main control portion 6.

Figure 4:
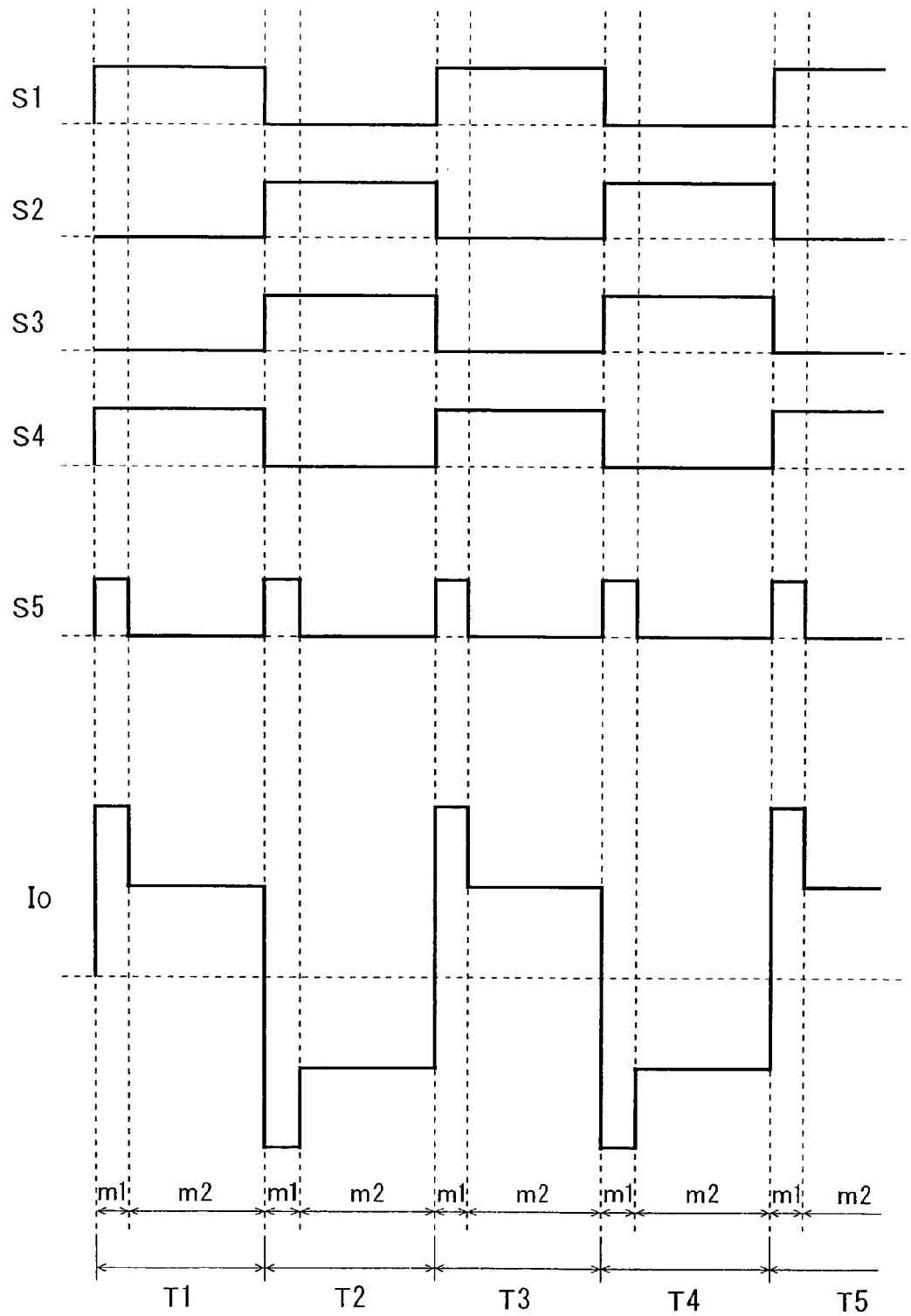
FIG. 4 is a timing chart of signals and a current flowing between electrodes according to a first embodiment.

Hereinafter, description will be given on the operation of the metal ion eluting unit according to the present invention. First, description will be given on the operation of a first embodiment performed by the metal ion eluting unit according to the present invention, with reference to FIGS. 3 and 4. FIG. 4 is a timing chart of signals and a current flowing between the electrodes during the operation of the first embodiment performed by the metal ion eluting unit according to the present invention.

The main control portion 6 has a built-in counter (not shown), and generates a mode switch signal S5 therein based on a counter value of the counter. The mode switch signal S5 is a signal in which the high-level period and the low-level period periodically switch to each other. The mode switch signals S5 at the high-level and low-level periods are set at mutually different values.

The main control portion 6 generates the control signals S1 to S4 based on the mode switch signal S5, and then outputs the control signals S1 to S4 to the NPN-type transistors Q1 to Q4, respectively. The control signals S1, S4 and the control signals S2, S3 complementarily switch between the high-level and the low-level. When the mode switch signal S5 inverts to become high, the control signals S1 to S4 are inverted respectively. As a result, at the intervals T1, T3, and T5, the electrode 102 serves as a positive electrode and the electrode 103 serves as a negative electrode, so that a current flows from the positive electrode 102 to the negative electrode 103. On the other hand, at the intervals T2 and T4, the electrode 103 serves as a positive electrode and the electrode 102 serves as a negative electrode, so that a current flows from the positive electrode 103 to the negative electrode 102. Accordingly, this periodical polarity reversal of the voltage applied between the electrodes permits preventing scale deposition.

The main control portion 6 controls the current value setting circuit 7 so that the value of a current outputted by the constant-current circuit 5 becomes larger when the mode switch signal S5 is at the high-level than when the mode switch signal S5 is at the low-level. When the mode switch signal S5 is at the high-level, the main control portion 6 controls the current value setting circuit 7 so that the current Io flowing between the electrodes becomes a first current value that has been set previously. When the mode switch signal S5 is at the low-level, the main control portion 6 controls the current value setting circuit 7 so that the current Io flowing between the electrodes becomes a second current value that is smaller than the first current value and that has been set previously. Consequently, when the mode switch signal S5 is at the high-level, the value of the current Io flowing between the electrodes becomes larger than when the mode switch signal S5 is at the low-level.

The effect of scale deposition prevention can be improved by increasing the current flowing between the electrodes at the initial voltage application period following the polarity reversal of the voltage applied between the electrodes. Moreover, since the scale deposition is prevented at the initial voltage application period following the polarity reversal of the voltage applied between the electrodes, the metal ion elution is stabilized after the initial voltage application period following the polarity reversal of the voltage applied between the electrodes has passed. Possible mechanism in improving the effect of scale deposition prevention achieved by increasing the current flowing between the electrodes at the initial voltage application period following the polarity reversal of the voltage applied between the electrodes is as follows. In the electrode that becomes positive after the polarity reversal of the voltage applied between the electrodes, metal, such as silver, in the surface where the scale deposits, elutes, thus causing a decrease in the binding force between the scale and the electrode, and electrical repulsion between the scale and the electrode surface.

Since increasing the current flowing between the electrodes causes a problem of shorter electrode life and a problem of too large elution concentration of metal ions, the metal ion eluting unit according to the present invention is configured such that a large current flows between the electrodes only at the initial voltage application period following the polarity reversal of the voltage applied between the electrodes. Therefore, at each of the intervals T1 to T5, a value (first current value) of the current Io flowing between the electrodes during the period of a first current mode m1 is larger than a value (second current value) of the current To flowing between the electrodes during the period of a second current mode m2. In order to avoid the problem of shorter electrode life and the problem of too large elution concentration of metal ions, it is preferable that the period of the first current mode m1 be shorter than the period of the second current mode m2.

In the embodiment described above, at each of the intervals T1 to T5, constant-current driving is performed during both the period of the first current mode m1 and the period of the second current mode m2. Alternatively, at each of the intervals T1 to T5, constant-voltage driving may be performed during the period of the first current mode m1, and the constant-voltage driving may be performed during the period of the second current mode m2. In the constant-voltage driving, the main control portion 6 controls the current value setting circuit 7 and the voltage value setting circuit 8 so that the voltage detected by the voltage-detection circuit 9 becomes constant. Performing the constant-voltage driving during the period of the first current m1 permits the flow of a maximum current in accordance with water quality or the interelectrode state during the period of the first current mode m1, thus further improving the effect of the scale deposition prevention. In the embodiment described above, since the constant-current driving is performed at each of the intervals T1 to T5 during both the period of the first current mode m1 and the period of the second current mode m2, the voltage value setting circuit 8 may not be provided.

The constant-voltage driving controls the voltage value to be kept constant regardless of a change in the resistance value between the electrodes. However, because the voltage value between the electrodes fluctuates due to a fluctuation in the supply voltage or a resistance change of circuit components attributable to temperature, it is difficult to keep the voltage value completely constant. When there is a risk that a current higher than the permitted range flows, such as in a case where the resistance value between the electrodes is considerably small, the voltage may be required to be decreased. However, even in such a case, a substantially constant voltage is applied between the electrodes without changing the voltage regardless of a change in the resistance value between the electrodes. This control is defined as the constant-voltage driving in this embodiment.

Figure 5:
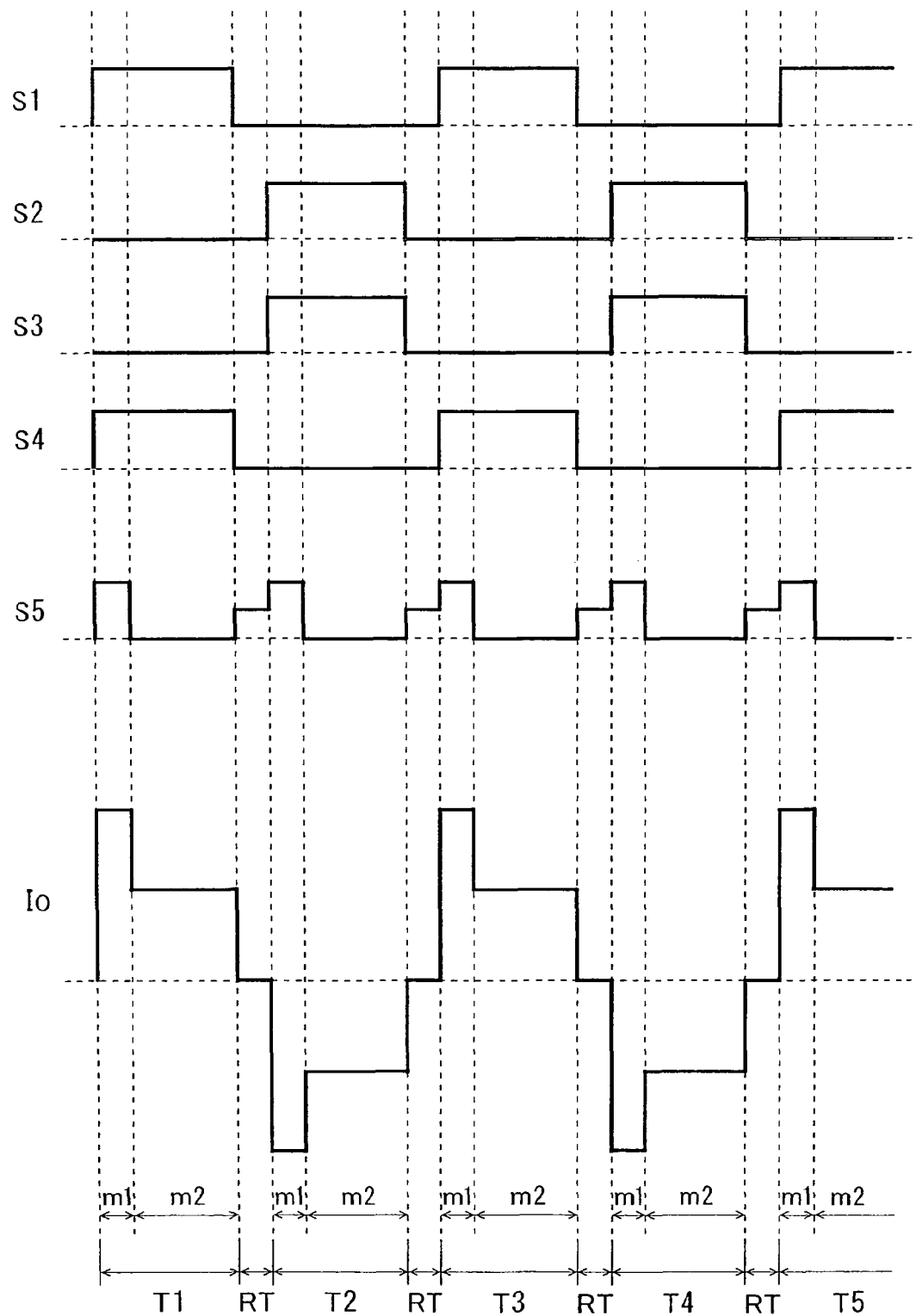
FIG. 5 is a timing chart of signals and a current flowing between electrodes according to a second embodiment.

Next, description will be given on the operation of a second embodiment performed by the metal ion eluting unit according to the present invention, with reference to FIGS. 3 and 5. FIG. 5 is a timing chart of signals and a current flowing between the electrodes during the operation of the second embodiment performed by the metal ion eluting unit according to the present invention. In FIG. 5, portions equivalent to those shown in FIG. 4 are provided with the same numerals, and thus are omitted from detailed description.

The mode switch signal S5 goes through a middle level provided for a predetermined period when switching from the low level to the high level. When the mode switch signal S5 is at the middle level, the main control portion 6 sets all the control signals S1 to S4 at the low levels. This reverses the polarity of the voltage applied between the electrodes with a voltage application rest time RT inserted during every reversal.

The metal ions eluted from the electrode which serves as a positive electrode before the voltage application rest time RT can be separated from this electrode at a sufficient distance during the voltage application rest time RT. Thus, even when this electrode turns into a negative electrode after the voltage application rest time RT, the metal ions eluted before the voltage application rest time RT is not pulled back by this electrode. Consequently, this does not waste the power consumed for the metal ion elution, and also avoids failure to provide a desired total mount of metal ions. Moreover, when the metal ion eluting unit according to the present invention is incorporated in an apparatus for application, a variation in the water metal ion concentration is decreased by providing the voltage application rest time RT. Thus, when the eluted metal ions are antibacterial, an even antibacterial effect can easily be achieved over a wide range.

Figure 6:
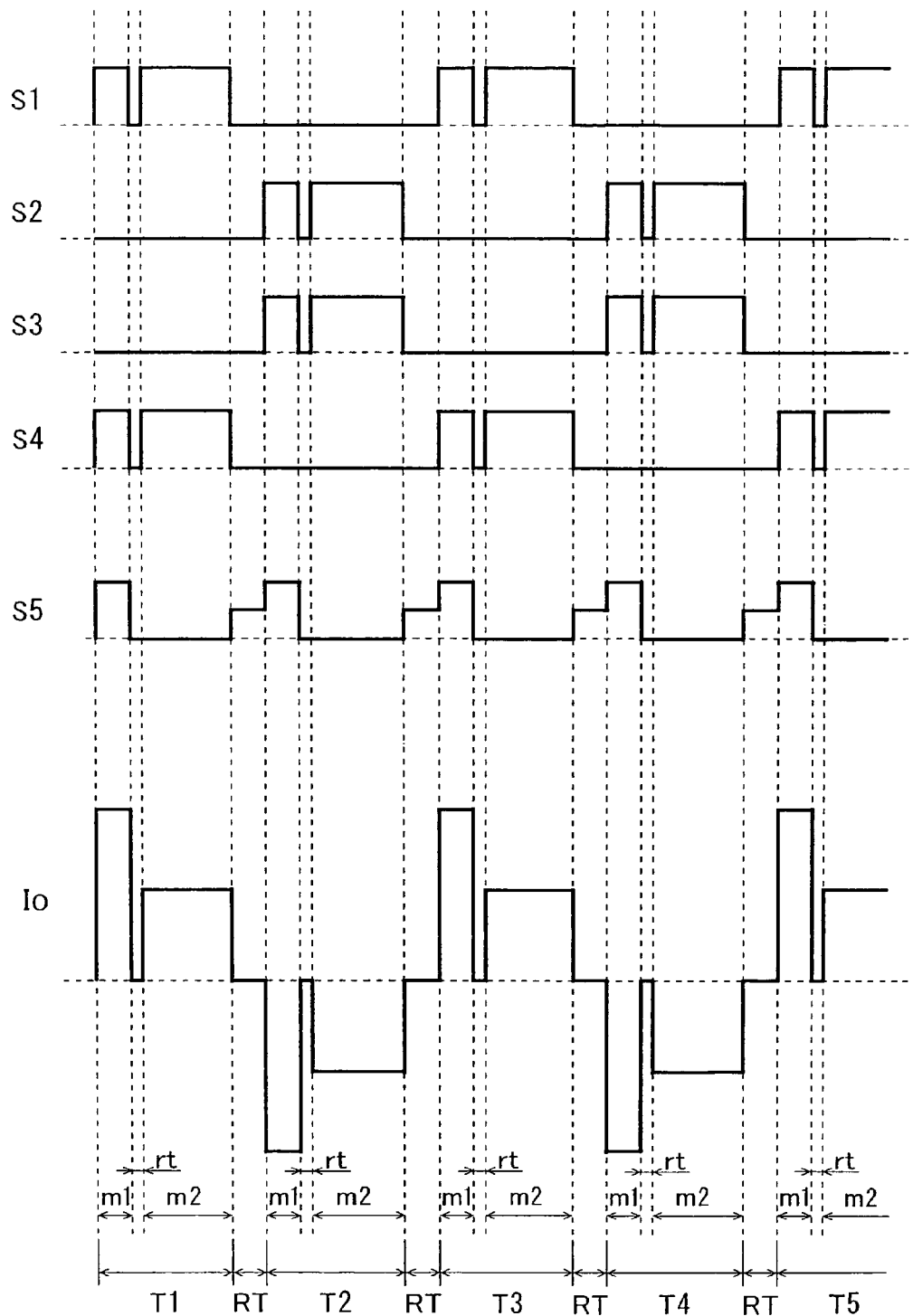
FIG. 6 is a timing chart of signals and a current flowing between electrodes according to a third embodiment.

Next, description will be given on the operation of a third embodiment performed by the metal ion eluting unit according to the present invention, with reference to FIGS. 3 and 6. FIG. 6 is a timing chart of signals and a current flowing between the electrodes during the operation of a third embodiment performed by the metal ion eluting unit according to the present invention. In FIG. 6, portions equivalent to those shown in FIG. 5 are provided with the same numerals, and thus are omitted from detailed description.

The main control portion 6 sets the control signals S1 to S4 at the low levels for a predetermined period after the mode switch signal S5 inverts to become low, thus resulting in transfer from the period of the first current mode m1 to the period of the second current mode m2 with the voltage application rest time rt inserted therebetween. Consequently, the scale depositing on the electrode which serves as a negative electrode before the polarity change of the voltage applied between the electrodes, and the like are stripped off from the electrode in the period of the first current mode m1 by the elution of metal ions from the electrode which serves as a positive electrode after the polarity change of the voltage applied between the electrodes. Since the scale stripped off from the electrode can be separated at a sufficient distance from the electrode facing this electrode, the scale stripped off are less likely to deposit again. This prevents the accumulation of the scale and the like on the electrode surface, thereby permitting stable metal ion elution.

Figure 7:
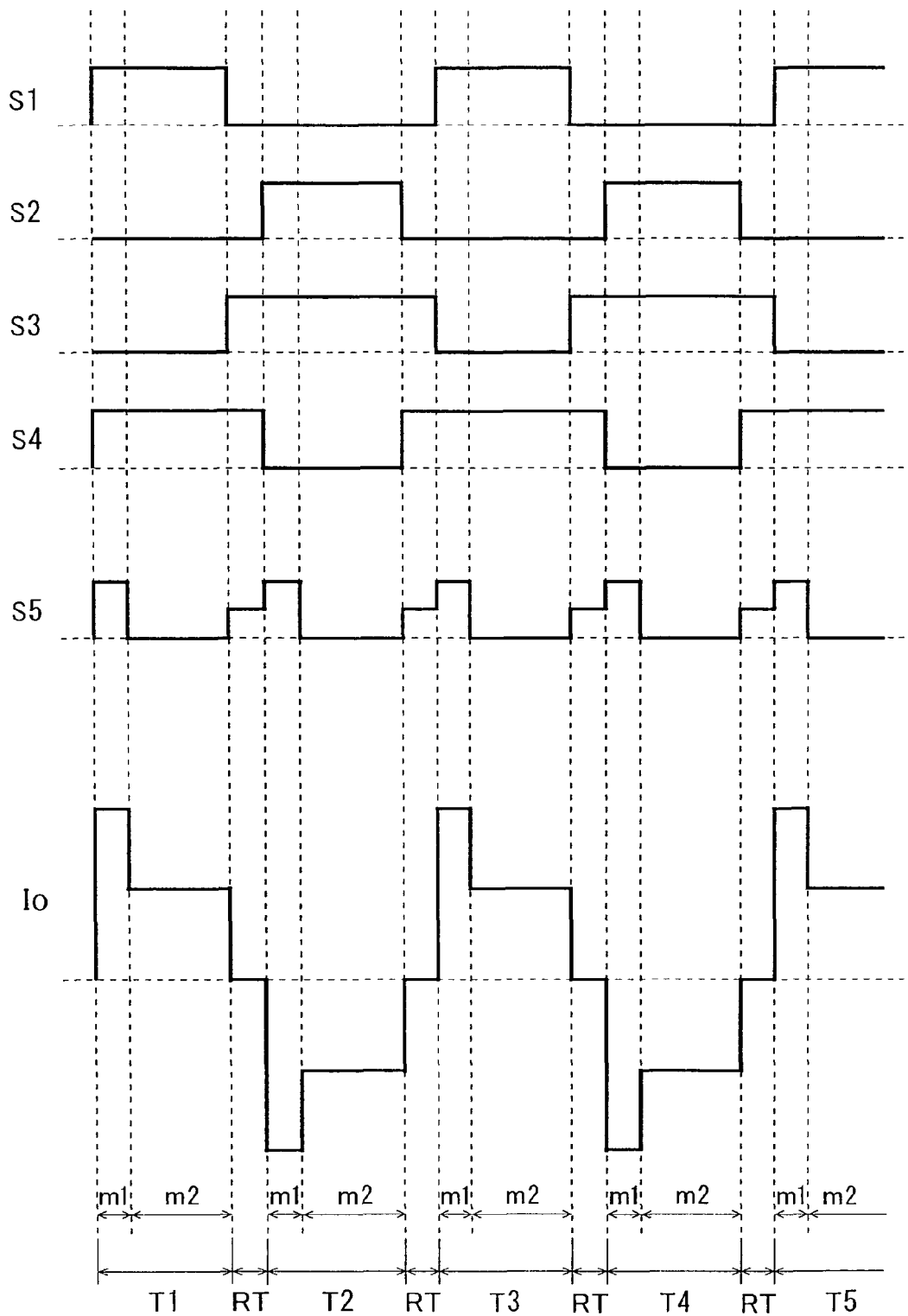
FIG. 7 is a timing chart of signals and a current flowing between electrodes according to a fourth embodiment.

Description will be given on the operation of a fourth embodiment performed by the metal ion eluting unit according to the present invention, with reference to FIGS. 3 and 7. FIG. 7 is a timing chart of signals and a current flowing between the electrodes during the operation of the fourth embodiment performed by the metal ion eluting unit according to the present invention. In FIG. 7, portions equivalent to those shown in FIG. 5 are provided with the same numerals, and thus are omitted from detailed description.

The fourth embodiment differs from the second embodiment in that, when the mode switch signal S5 is at the middle level, the control signals S1 and S2 are at the low levels and the control signals S3 and S4 are at the high levels. This permits a short-circuit between the electrodes 102 and 103 and thus provides zero potential difference between the electrodes 102 and 103 in the voltage application rest time RT. The residual potential difference between the electrodes 102 and 103 during the voltage application rest time RT is a factor contributing to scale deposition, though in a very small amount. Therefore, providing a short-circuit between the electrodes 102 and 103 and providing completely zero potential difference between the electrodes 102 and 103 prevents the scale deposition in the voltage application rest time RT.

Similarly, in the voltage application rest time A of the third embodiment, the controls signals S1 and S2 may be set at the low levels and the control signals S3 and S4 may be set at the high levels, thereby providing a short-circuit between the electrodes 102 and 103 and providing completely zero potential difference between the electrodes 102 and 103.

Description will be given on the setting of the value of the current Io flowing between the electrodes during the period of the second current mode m2. As already mentioned in "Problems to be Solved by the Invention", the elution efficiency of metal ions decreases due to not only the scale deposition but also the water quality.

Figure 8:
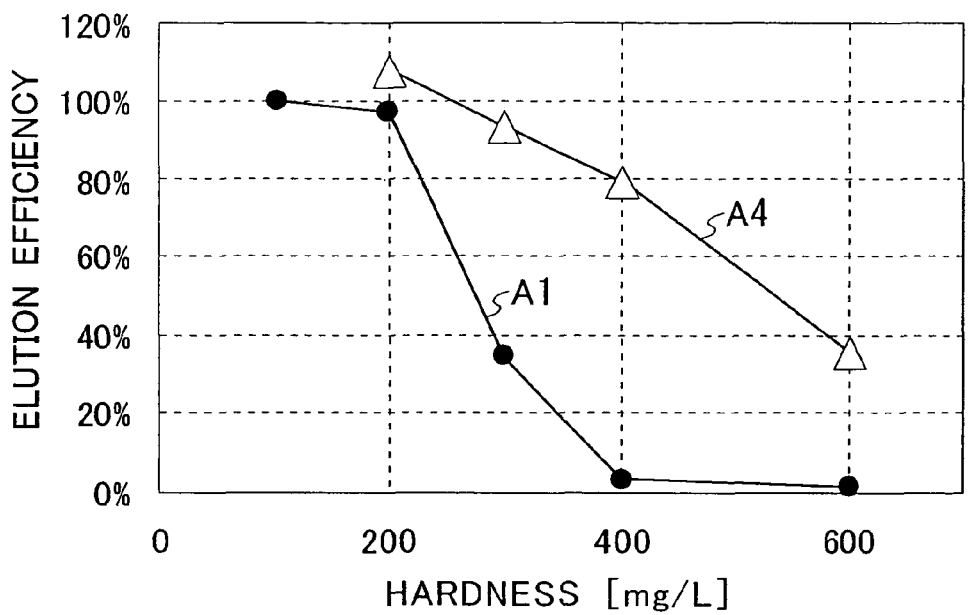
FIG. 8 is a diagram showing the relationship between the elution efficiency and the water hardness.
Figure 9:
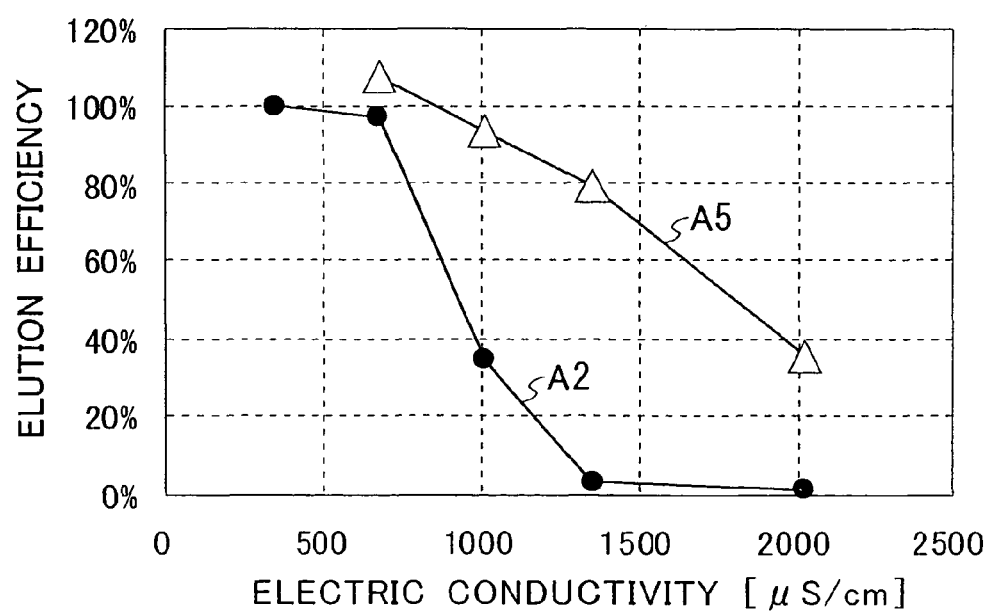
FIG. 9 is a diagram showing the relationship between the elution efficiency and the water electric conductivity.
Figure 10:
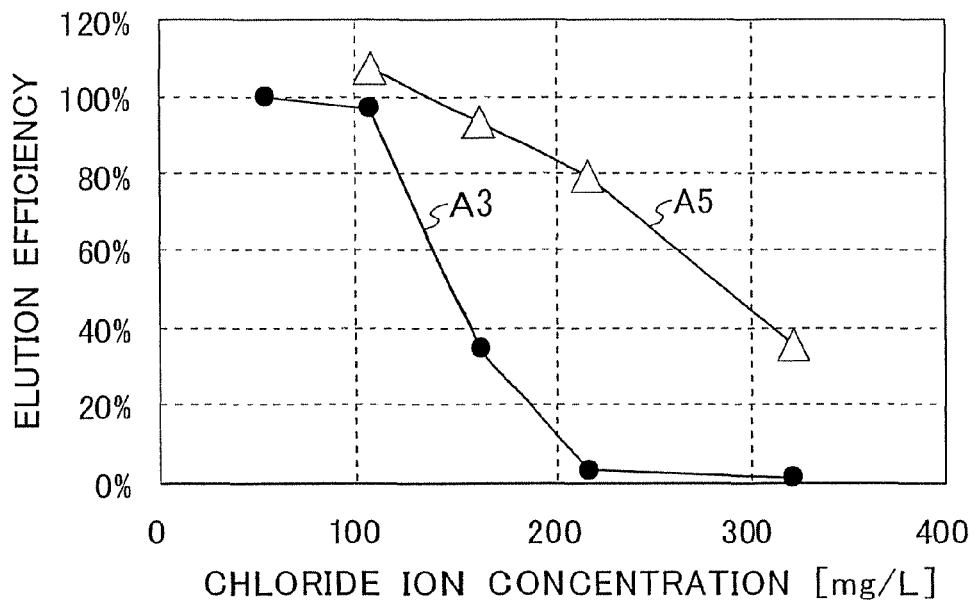
FIG. 10 is a diagram showing the relationship between the elution efficiency and the water chloride ion concentration.

FIG. 8 shows the relationship between the elution efficiency and the water hardness as one factor of water quality. FIG. 9 shows the relationship between the elution efficiency and the water electric conductivity as another factor of water quality. FIG. 10 shows the relationship between the elution efficiency and the water chloride ion concentration as still another factor of water quality. In FIGS. 8 to 10, with reference to the Japanese standard city water having a hardness of 100 mg/L, an electric conductivity of 340 µS/cm, and a chloride ion concentration of 54 mg/L, the elution efficiency of metal ions with a current of 29 mA flowing between the electrodes of the metal ion eluting unit by using the aforementioned water is defined as 100%. In these figures, the electrode size and the pattern of voltage application between the electrodes of the metal ion eluting unit are all identical.

In FIGS. 8 to 10, characteristic lines A1 to A3 are characteristic lines when the value of the current flowing between the electrodes of the metal ion eluting unit is 29 mA. Characteristic lines A4 to A6 are characteristic lines when the value of the current flowing between the electrodes of the metal ion eluting unit is 94 mA.

As is obvious from FIGS. 8 to 10, higher water hardness, higher water electric conductivity, and higher water chloride ion concentration each results in more decrease in the elution efficiency of metal ions. As is obvious from the comparison between the characteristic lines A1 to A3 and the characteristic lines A4 to A6, the elution efficiency of metal ions can be improved by increasing the value of the current flowing between the electrodes of the metal ion eluting unit.

Therefore, setting the value (second current value) of the current Io flowing between the electrodes during the period of the second current mode m2 in accordance with the water quality permits constantly ensuring an appropriate elution concentration of metal ions.

Accordingly, in the metal ion eluting unit according to the present invention, the value (second current value) of the current Io flowing between the electrodes during the period of the second current mode m2 is changed in accordance with the water quality.

Figure 11A:
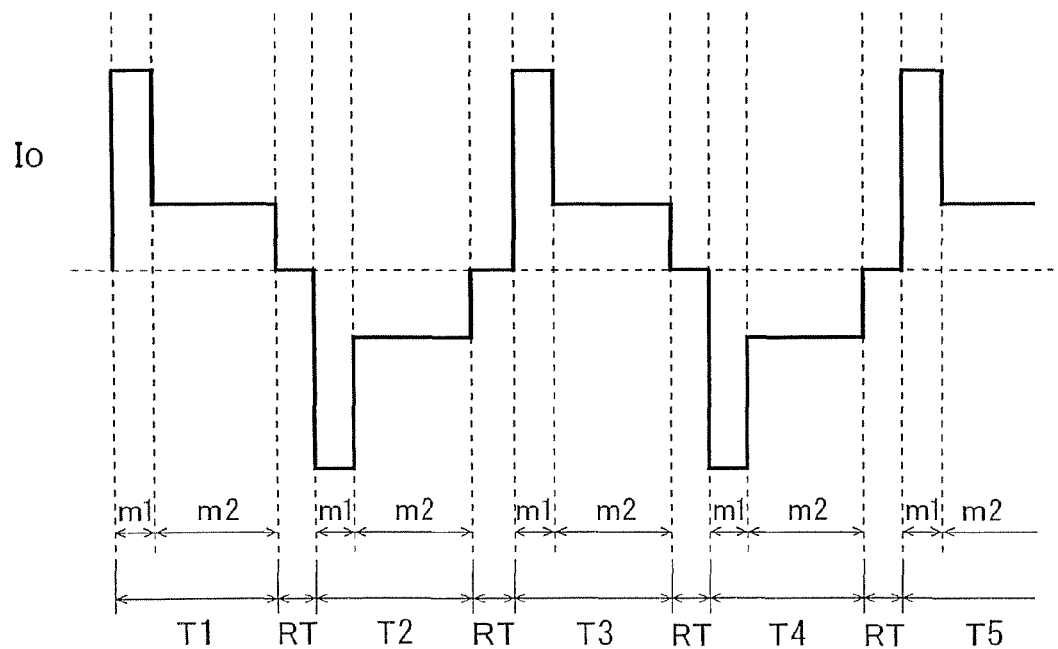
FIGS. 11A to 11C are timing charts of a current flowing between electrodes when the current value is changed in accordance with water quality.

For example, when water to be used has small electric conductivity, the value (second current value) of the current flowing between the electrodes during the period of the second current mode m2 is decreased, as shown in FIG. 11A. When water to be used has large electric conductivity, the value (second current value) of the current flowing between the electrodes during the period of the second current mode m2 is increased, as shown in FIG. 11C.

The scale depositability also changes in accordance with the water quality. Therefore, setting the value (first current value) of the current Io flowing between the electrodes during the period of the first current mode m1 in accordance with the water quality permits constantly and appropriately preventing the scale deposition. Thus, the value (first current value) of the current flowing between the electrodes during the period of the first current mode m1 may be changed in accordance with the water quality.

Figure 11B:
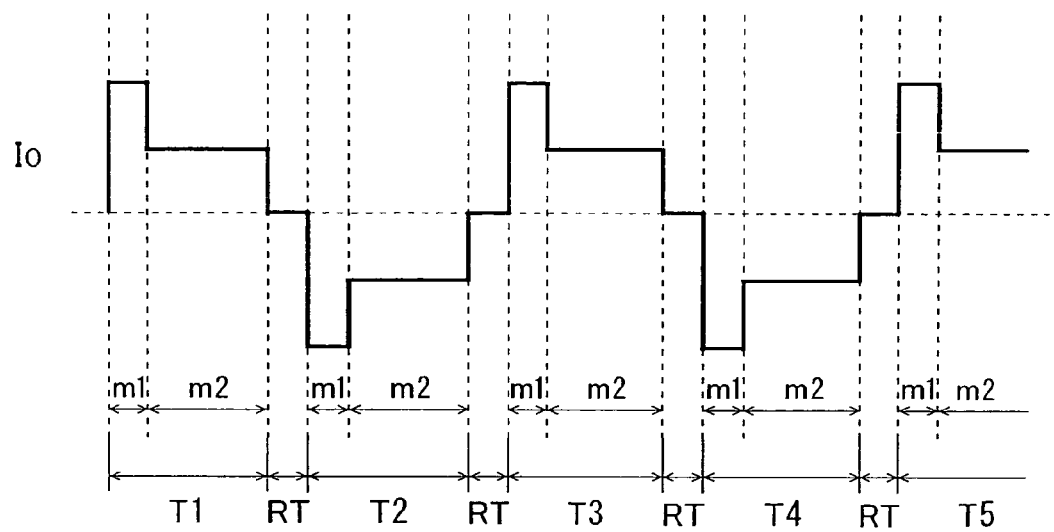
Figure 11C:
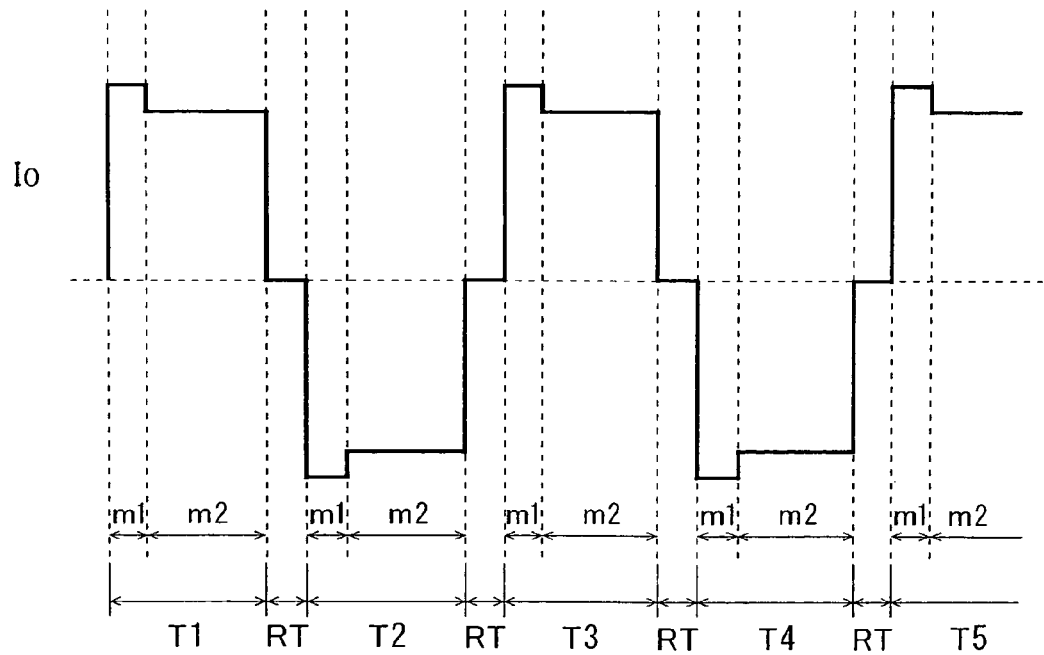

When water to be used has large scale depositability, the value (first current value) of the current flowing between the electrodes during the period of the first current mode m1 may be increased, as shown in FIGS. 11A and 11C. When water to be used has small scale depositability, the value (first current value) of the current flowing between the electrodes during the period of the first current mode m1 may be decreased, as shown in FIG. 11B The set current value is changed in accordance with the water quality in FIGS. 11A to 11C. The time ratio of the first current mode m1 to the second current mode m2 may be changed in accordance with the water quality.

Figure 12A:
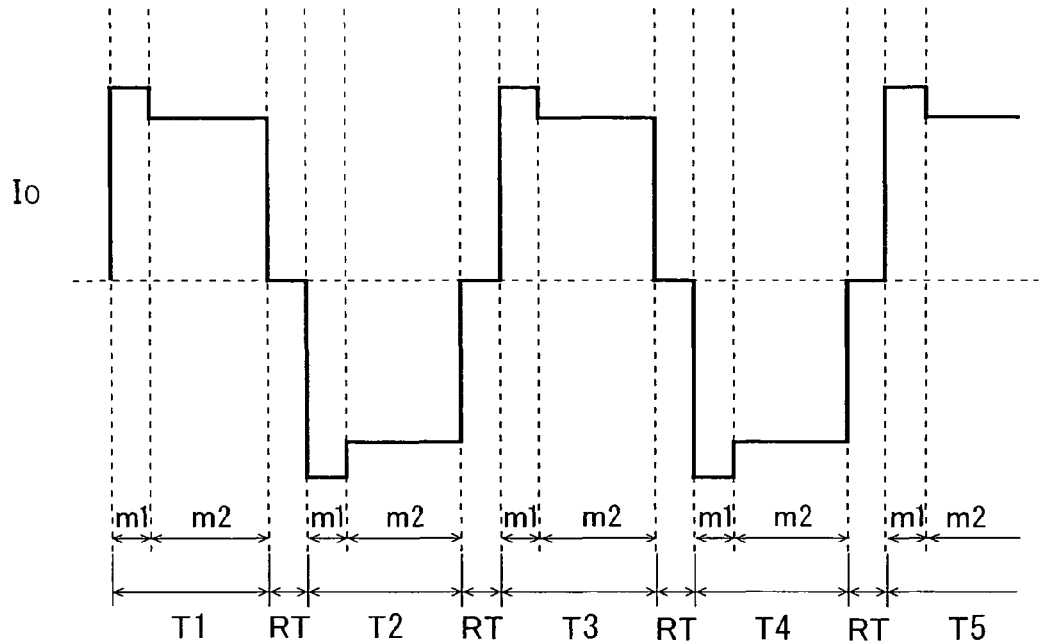
FIGS. 12A and 12B are timing charts of a current flowing between electrodes when the time ratio of a first current mode to a second current mode is changed in accordance with the water quality.
Figure 12B:
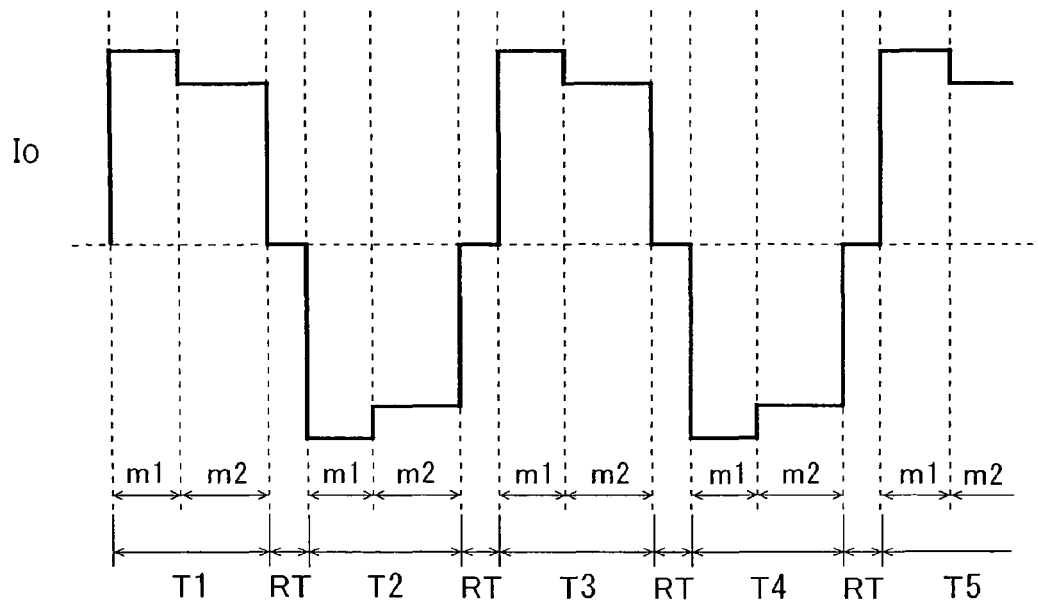

For example, when water to be used has large electric conductivity and large scale depositability, as shown in FIG. 12A, the value (first current value) of the current Io flowing between the electrodes during the period of the first current mode m1 and the value (second current value) of the current Io flowing between the electrodes during the period of the second current mode m2 may be increased. When water to be used has large electric conductivity and very large scale depositability, as shown in FIG. 12B, the value (first current value) of the current Io flowing between the electrodes during the period of the first current mode m1 and the value (second current value) of the current Io flowing between the electrodes during the period of the second current mode m2 may be increased, and also the time ratio of the period of the first current mode m1 to the period of the second current mode m2 may be increased.

For larger scale depositability, the value (first current value) of the current flowing between the electrodes during the period of the first current mode m1 may be set larger. In many cases, however, an upper limit of the current value is provided due to the circuit limitations. When such an upper limit of the current value is provided, it is effective to change the time ratio of the period of the first current mode m1 to the period of the second current mode m2 in accordance with the water quality as described above.

There is a possible embodiment such that, in each use of the metal ion eluting unit according to the present invention, the value (first current value) of the current Io flowing during the period of the first current mode m1, the value (second current value) of the current Io flowing during the period of the second current mode m2, or the time ratio of the period of the first current mode m1 to the period of the second current mode m2 is set at an optimum value. Moreover, there is another possible embodiment such that a means for inputting water quality information is provided to an apparatus including the metal ion eluting unit according to the present invention, and then, in accordance with the input water quality information, the value (first current value) of the current Io flowing during the period of the first current mode m1, the value (second current value) of the current Io flowing during the period of the second current mode m2, or the time ratio of the period of the first current mode m1 to the period of the second current mode m2 be set at an optimum value. However, it is more preferable that the metal ion eluting unit according to the present invention itself includes a water quality detection portion for detecting water quality, and then, in accordance the detected water quality, the value (first current value) of the current Io flowing during the period of the first current mode m1, the value (second current value) of the current Io flowing during the period of the second current mode m2, or the time ratio of the period of the first current mode m1 to the period of the second current mode m2 be set at an optimum value.

Figure 13A:
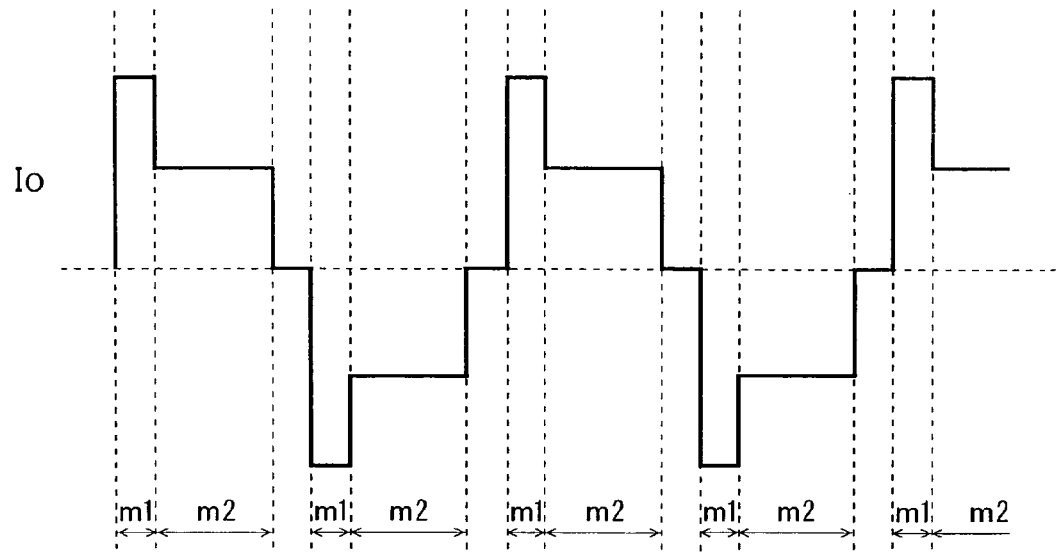
FIGS. 13A and 13B are timing charts of a current flowing between electrodes when both the polarity reversal period and the time ratio are changed in accordance with the water quality.
Figure 13B:
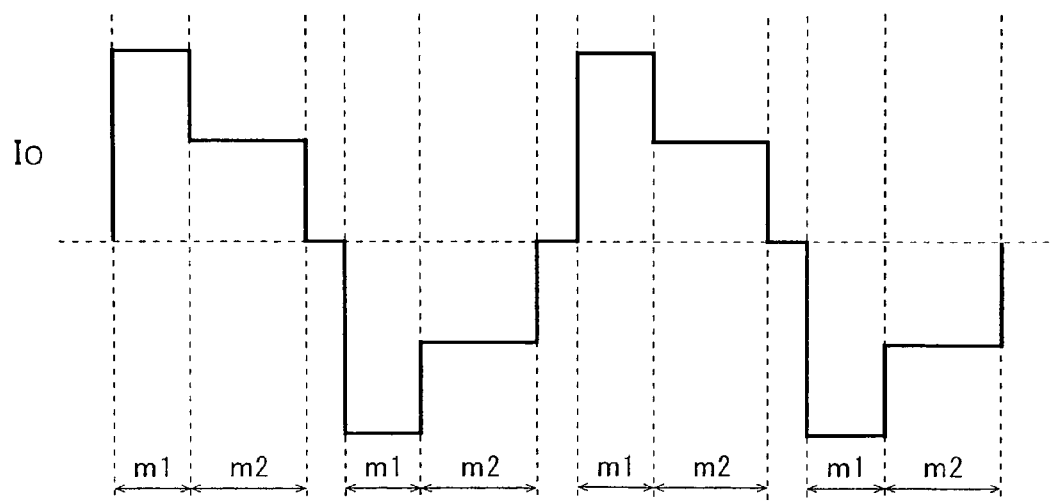

The period of the polarity reversal of the voltage applied between the electrodes can also be changed in accordance with the water quality. Providing a longer period of the polarity reversal while keeping the time ratio of the period of the first current mode m1 to the period of the second current mode m2 results in an increase in the ion elution efficiency. Alternatively, as shown in FIGS. 13A and 13B, both the polarity reversal period and the time ratio may be changed. FIGS. 13A and 13B show examples when the period of the first current mode m1 is changed in accordance with the water quality while the period of the second current mode m2 is not changed. When water to be used has large electric conductivity and large scale depositability, the condition as shown in FIG. 13A is set. When water to be used has large electric conductivity and very large scale depositability, the condition as shown in FIG. 13B is set.

Now, description will be given on an example of the water quality detection portion which is preferably provided to the metal ion eluting unit according to the present invention. The water quality detection portion includes the voltage-detection circuit 9 and the current-detection circuit 10 shown in FIG. 3. The voltage-detection circuit 9 detects a voltage applied between the electrodes 102 and 103 during the period in which the NPN-type transistors Q1 and Q4 are ON and the NPN-type transistors Q2 and Q3 are OFF, or during the period in which the NPN-type transistors Q1 and Q4 are OFF and the NPN-type transistors Q2 and Q3 are ON. The current-detection circuit 10 detects a current flowing between the electrodes 102 and 103.

The water quality is detected by detecting the value of the voltage applied between the electrodes 102 and 103 and the value of the current flowing between the electrodes 102 and 103 under a predetermined condition. For example, detecting a small current flowing between the electrodes 102 and 103 regardless of a high voltage applied between the electrodes 102 and 103 permits detecting that the electric conductivity, one factor of water quality, is small.

Figure 14:
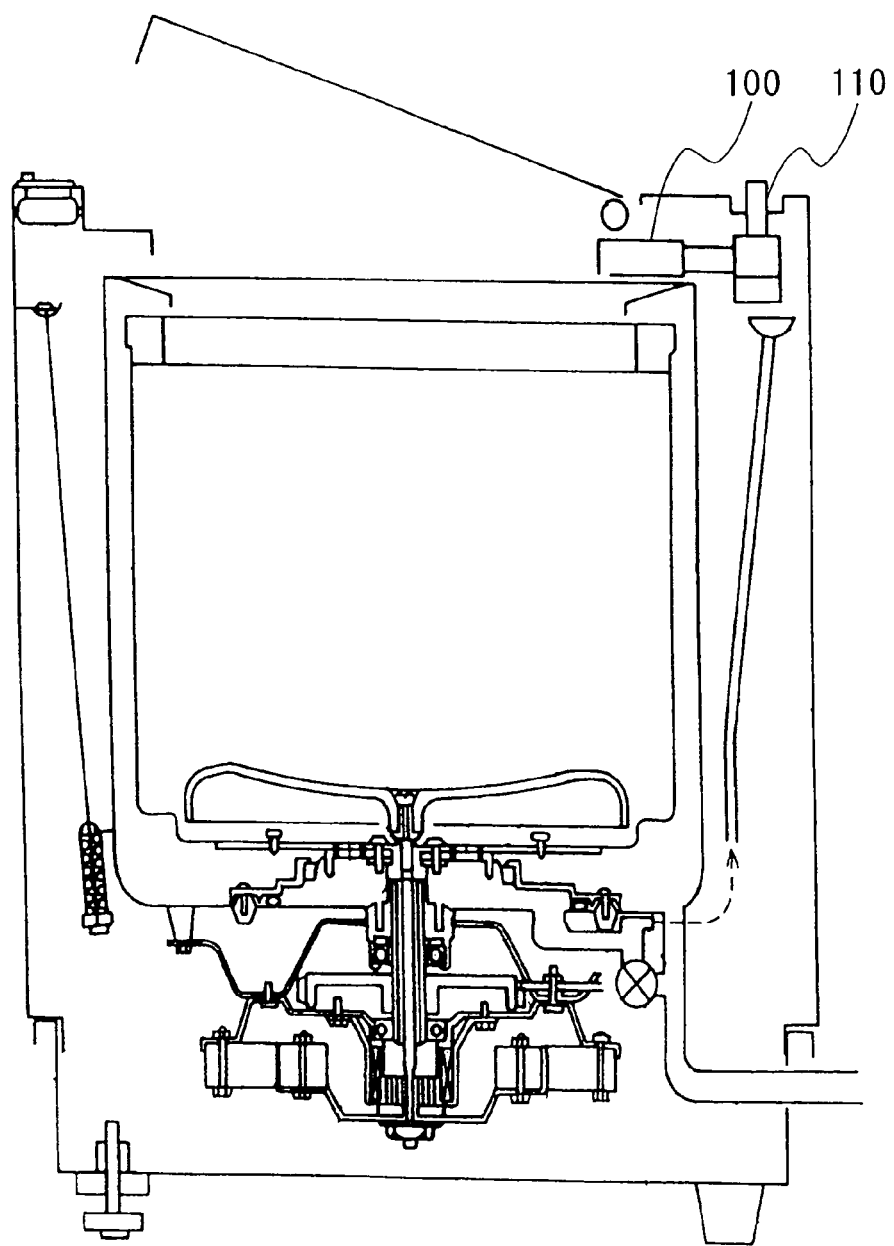
FIG. 14 is a vertical cross section of a washing machine according to the present invention.

The metal ion eluting unit according to the present invention can be loaded in various apparatuses. Description here will be given, referring to a washing machine, as an example, in which the metal ion eluting unit according to the present invention is loaded. FIG. 14 is a vertical cross section of the washing machine in which the metal ion eluting unit according to the present invention described above is loaded. Portions equivalent to those shown in FIG. 1 are provided with the same numerals.

The washing machine shown in FIG. 14 has, in a water supply path 110, an ion eluting portion 100 of the metal ion eluting unit according to the present invention described above. Antibacterial metal ions generated by this ion eluting portion 100 are added to washing water before used. This subjects laundry to an antibacterial treatment by use of antibacterial metal ions, thereby preventing the propagation of bacteria and mold, and also preventing the production of foul smells.

Even when sold in various foreign regions having different water quality, the washing machine shown in FIG. 14 can maintain an optimum metal ion concentration and thus exert an antibacterial effect without being influenced by water quality, while eliminating a variation in the electrode life caused by water quality difference.

The scope of the present invention is not limited to the embodiment of the present inn described above. Various modifications are permitted without departing from the sprit of the invention.

INDUSTRIAL APPLICABILITY

The metal ion eluting unit of the present invention is applicable to various water-using apparatuses, such as washing machines.

The invention claimed is:

1. A metal ion eluting unit, comprising:
a plurality of electrodes;
a drive circuit that applies a voltage between the electrodes, such that the metal ion eluting unit elutes metal ions from one of the electrodes serving as a positive electrode by applying the voltage between the electrodes;
a control circuit that controls the drive circuit so that the drive circuit periodically reverses a polarity of the voltage applied between the electrodes; and
at least one of:
(a) a constant-current circuit and a current value setting circuit that control current output from the constant-current circuit and applied to the drive circuit, and
(b) a constant-voltage circuit and a voltage value setting circuit that control voltage output from the constant-voltage circuit and applied to the drive circuit,
wherein the control unit includes a counter that counts a first predetermined period and a second predetermined period, within a period beginning at a first point in time where the voltage applied between the electrodes changes from one of a negative voltage and a positive voltage to the other of the negative voltage and the positive voltage, and ending at a second point in time, where the polarity changes from the other of the negative voltage and the positive voltage to the one of the positive voltage and the negative voltage, and is configured to operate the drive circuit, from the first point in time until the first predetermined period elapses, in a first current mode, by controlling the at least one of the current value setting circuit and the voltage value setting circuit, in which a value of a current flowing between the electrodes equals a first current value, and operates the drive circuit thereafter in a second current mode until the second predetermined period elapses, by controlling the at least one of the current value setting circuit and the voltage value setting circuit, in which a value of the current flowing between the electrodes equals a second current value smaller than the first current value.

2. The metal ion eluting unit according to claim 1, wherein the first predetermined period is shorter than the second predetermined period.

3. The metal ion eluting unit according to claim 1, wherein the control circuit controls the voltage value setting circuit to perform constant-voltage driving during the first predetermined period and controls the current value setting circuit to perform constant-current driving during the second predetermined period.

4. The metal ion eluting unit according to claim 1, wherein the polarity of the voltage applied between the electrodes is periodically reversed with a voltage application rest time inserted during every reversal.

5. The metal ion eluting unit according to claim 4, wherein a short-circuit is made between the electrodes during the voltage application rest time.

6. The metal ion eluting unit according to claim 1, wherein transfer from the first current mode to the second current mode occurs with a voltage application rest time inserted therebetween.

7. The metal ion eluting unit according to claim 6, wherein a short-circuit is made between the electrodes during the voltage application rest time.

8. The metal ion eluting unit according to claim 1, further comprising:
a water quality detection portion which detects water quality of water existing between the electrodes,
wherein the control circuit is configured to change at least one of the first current value and the second current value in accordance with the water quality detected by the water quality detection portion.

9. The metal ion eluting unit according to claim 8, wherein the water quality detection portion detects at least one of water hardness, water electric conductivity, and water chloride ion concentration.

10. The metal ion eluting unit according to claim 8, wherein the water detection portion detects the water quality by detecting at least one of the voltage between the electrodes and the current flowing between the electrodes.

11. The metal ion eluting unit according to claim 1, further comprising:
a water quality detection portion which detects water quality of water mediating between the electrodes,
wherein the control circuit is configured to change at least one of a time ratio of the first predetermined period to the second predetermined period and a polarity reversal period of the voltage applied between the electrodes in accordance with the water quality detected by the water quality detection portion.

12. The metal ion eluting unit according to claim 11, wherein the water quality detection portion detects at least one of water hardness, water electric conductivity, and water chloride ion concentration.

13. The metal ion eluting unit according to claim 11, wherein the water detection portion detects the water quality by detecting at least one of the voltage between the electrodes and the current flowing between the electrodes.

14. The metal ion eluting unit according to claim 1, wherein part or all of the metal ions eluted are any of silver ions, copper ions, and zinc ions.

15. An apparatus, comprising:
the metal ion eluting unit according to claim 1.

16. The apparatus according to claim 15, wherein the apparatus is a washing machine.

* * * * *